(12) United States Patent
Mertz et al.

(10) Patent No.: US 6,400,493 B1
(45) Date of Patent: *Jun. 4, 2002

(54) FOLDED OPTICAL SYSTEM ADAPTED FOR HEAD-MOUNTED DISPLAYS

(75) Inventors: Pierre H. Mertz, Mountain View; Shahida Rana, Fremont, both of CA (US)

(73) Assignee: Agilent Technologies, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/428,133

(22) Filed: Oct. 26, 1999

(51) Int. Cl.[7] ............................................. G02B 26/08
(52) U.S. Cl. ........................................................ 359/301
(58) Field of Search ................................ 359/483–502, 359/301

(56) References Cited

U.S. PATENT DOCUMENTS

| | | | |
|---|---|---|---|
| 4,653,875 A | 3/1987 | Hines | 359/631 |
| 4,847,693 A | * 7/1989 | Eppolito | 358/225 |
| 5,654,828 A | 8/1997 | Takayoshi et al. | 359/633 |
| 5,734,505 A | 3/1998 | Seiichiro et al. | 359/631 |

FOREIGN PATENT DOCUMENTS

| | | | |
|---|---|---|---|
| EP | EP 0803756 A | 10/1997 | |
| GB | 0 803 756 A1 | * 4/1997 | |
| WO | WO 99 30199 A | 6/1999 | |
| WO | WO 0102893 A | 1/2001 | |

* cited by examiner

Primary Examiner—Georgia Epps
Assistant Examiner—John J. Magee

(57) ABSTRACT

An optical imaging assembly for imaging light from a display. The optical assembly is constructed from first and second linear polarization filters, first and second lenses that are preferably concave-convex lenses, and first and second ¼ wave plates. The first linear polarization filter passes light polarized in a first direction, and second linear polarization filter passes light polarized in a second direction that is orthogonal to the first direction. A folded imaging assembly is constructed from the first and second lenses and the first ¼ wave plate. The first and second lenses have partially reflecting coatings on one surface of each lens. The folded imaging assembly and the second ¼ wave plate are located between the first and second linear polarization filters. In the preferred embodiment of the present invention, the first ¼ wave plate has a birefringence axis that is orthogonal to the birefringence axis of the second ¼ wave plate and the two ¼ wave plates are constructed from the same material. The partially reflective coating of one of the first and second lenses preferably includes a material having a reflectivity that depends on the direction of linear polarization of light striking the reflective coating. The surfaces of the convex-concave lenses are preferably spherical. The lenses preferably provide a substantially telecentric optical imaging system.

7 Claims, 2 Drawing Sheets

FOLDED OPTICAL SYSTEM ADAPTED FOR HEAD-MOUNTED DISPLAYS

FIELD OF THE INVENTION

The present invention relates to optical systems for viewing a display, and more particularly, to an optical system which utilizes a folded optical path to minimize the distance between the display and the viewer.

BACKGROUND OF THE INVENTION

To simplify the following discussion, the present invention will be discussed in terms of displays utilized in head mounted computer displays; however, it will be apparent to those skilled in the art from the following discussion that the present invention may be applied to other types of imaging systems. Head-mounted computer displays may be viewed as "eye glasses" that are worn by the user to view images created by a computer or other image source. The image seen by each eye is generated on a display screen having a two dimensional array of pixels.

It is advantageous to minimize the distance between the display and the eye of the viewer to minimize the portion of the display that extends from the viewer's face. Large overhanging displays are uncomfortable to wear. In addition, it is advantageous to be able so see around the display, so the folded optical system and display should not occlude the user's vision of the surrounding view.

Prior art systems that combine reflective optics with short display to eye distances are known to the art. These systems typically utilize partially reflecting optical surfaces to fold the optical path so that the distance from the viewer's eye to the display is minimized. Such a system is described in U.S. Pat. No. 5,644,436. For such systems to operate, the direct light emitted by the display must be blocked. Prior art systems typically utilize polarization filters and quarter wave plates to block the direct light from reaching the eye. Unfortunately, quarter wave plates only rotate the polarization vector of the light through precisely 90 degrees for specific wavelengths. Light having wavelengths that differ from the design wavelength is rotated either through slightly more than 90 degrees or slightly less than 90 degrees. Accordingly, these prior art systems do not block all of the light coming directly from the display and the viewer sees "ghost" images.

In addition, the optical system taught in the '436 patent is not telecentric. A telecentric optical system is one in which the chief rays are all perpendicular to the display. Since the display is reflective, a non-telecentric display must vary the angle of incidence of the illuminating light with position on the display to provide an image, which is uniform in intensity. If liquid crystal displays are utilized, however, the presence of non-normally incident light on the display makes it difficult to optimize the liquid crystal display elements.

Finally, the optical system taught in the '436 patent is inefficient in its use of light. Less than $\frac{1}{16}^{th}$ of the light leaving the light source actually reaches the observer's eye. Accordingly, a much larger light source is needed. The larger light source increases the size of the display and the power needed to run the display.

Broadly, it is the object of the present invention to provide an improved folded optical system based on reflective optical imaging elements.

It is a further object of the present invention to provide an optical system in which light from the display being imaged is blocked from reaching the viewer's eye independent of the wavelength of the light.

It is yet another object of the present invention to provide an optical system that is substantially telecentric.

It is a still further object of the present invention to provide an optical system that requires a lower intensity light source Man prior art systems.

These and other objects of the present invention will become apparent to those skilled in the art from the following detailed description of the invention and the accompanying drawings.

SUMMARY OF THE INVENTION

The present invention is an optical imaging assembly for imaging light from a display. The optical assembly is constructed from first and second linear polarization filters, first and second lenses that are preferably convex-concave lenses, and first and second ¼ wave plates. The first linear polarization filter passes light polarized in a first direction, and the second linear polarization filter passes light polarized in a second direction that is orthogonal to the first direction. A folded imaging assembly is constructed from the first and second lenses and the first ¼ wave plate. The first and second lenses have partially reflecting coatings on one surface of each lens. The folded imaging assembly and the second ¼ wave plate are located between the first and second linear polarization filters. In the preferred embodiment of the present invention, the first ¼ wave plate has a birefringence axis that is orthogonal to the birefringence axis of the second ¼ wave plate and the two ¼ wave plates are constructed from the same material. The partially reflective coating of one of the first and second lenses preferably includes a material having a reflectivity that depends on the direction of linear polarization of light striking the reflective coating. The surfaces of the convex-concave lenses are preferably spherical. The lenses preferably provide a substantially telecentric optical imaging system.

DETAILED DESCRIPTION OF THE INVENTION

Figure 1:
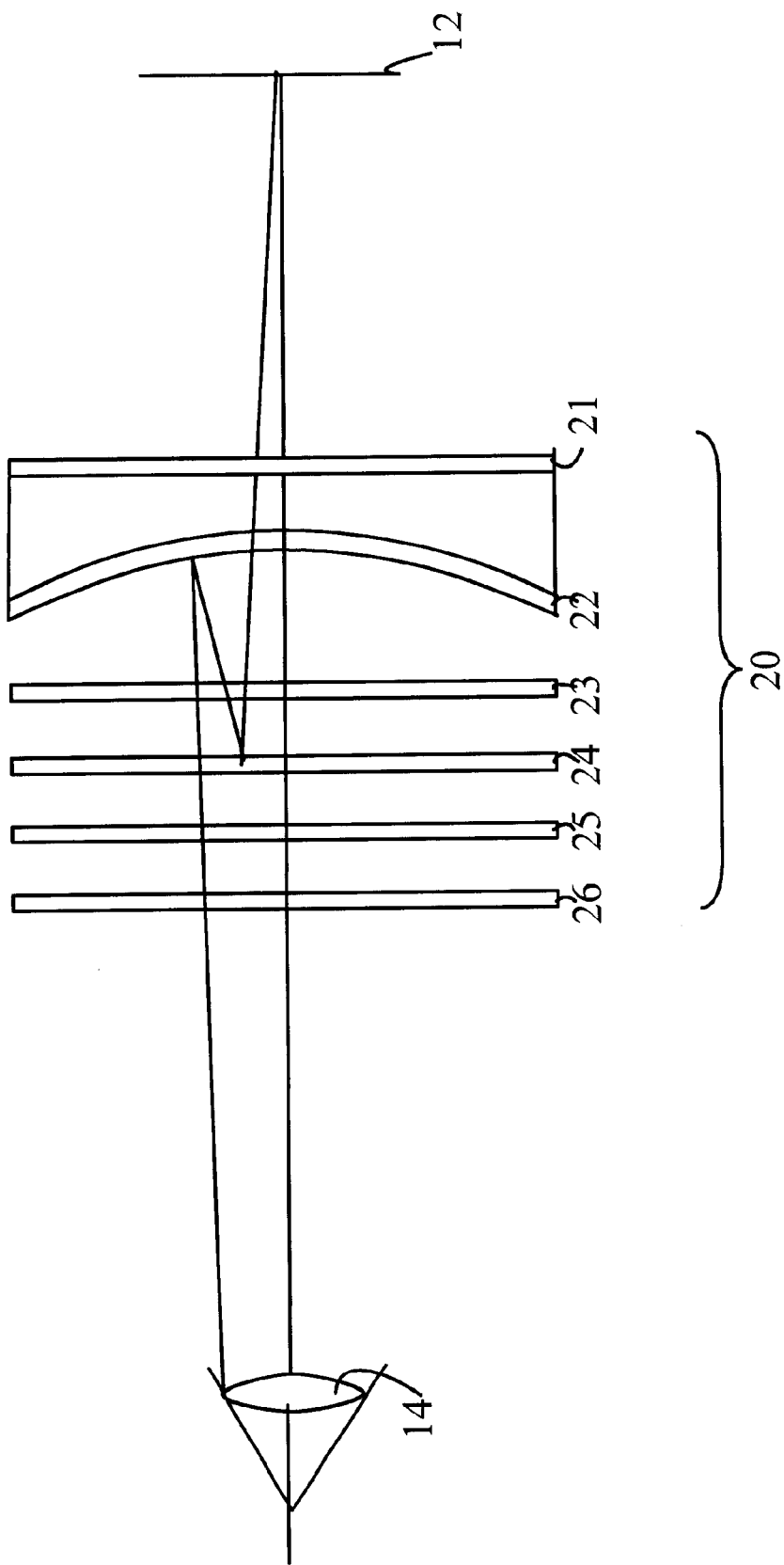
FIG. 1 is a cross-sectional view of a prior art folded optical imaging assembly.

The manner in which the present invention avoids the ghosting problems of prior art systems may be more easily understood with reference to FIG. 1 which is a block diagram of a typical prior art folded optical assembly 20. Optical assembly 20 images light from display 12 into the eye of a viewer 14 using a spherical beam splitter 22 as the imaging element. Ideally, light traveling directly from display 12 to viewer 14 is blocked. Assembly 20 utilizes crossed polarization filters 21 and 26 to prevent light traveling directly from display 12 from reaching viewer 14.

For assembly 20 to operate properly, the light that is collimated by spherical beam splitter 22 must undergo a 90 degree rotation of its polarization relative to the light that passes directly from display 12 to viewer 14. Assembly 20 utilizes the observation that circularly polarized light changes its direction of polarization upon reflection; whereas, linearly polarized light does not change its direction of polarization on reflection. Light passing through ¼ wave plate 23 leaves ¼ wave plate 23 circularly polarized. Assume the light is right handed. The direction of polarization of this light is then changed to left handed upon reflection from beam splitter 24. Upon passing again through ¼ wave plate 23, the light becomes linearly polarized. Hence, when the light is reflected by spherical beam splitter 22, the direction of polarization is not changed. This light is then converted back to left-handed circularly polarized light upon passing through ¼ wave plate 23. The left handed circularly polarized light that passes through beam splitter 24 is converted back to linearly polarized light by ¼ wave plate 25. However, the direction of linear polarization will have been rotated by 90 degrees relative to the direction of polarization of the light leaving polarization filter 21 because of the conversion of the right-handed polarization to the left handed polarization discussed above. Hence, this light will pass through polarization filter 26.

The light passing directly from display 12 without reflection passes through both ¼ wave plates. If the ¼ wave plates behave in an ideal manner, they will act as a ½ wave plate and the direction of polarization of the light will rotate by 90°. A ¼ wave plate is a birefringent material where the thickness is chosen such that there is a phase retardation of $\pi/2$ between the fast and slow polarizations. If the light source's polarization axis is aligned to 45° between the slow and fast axis of the wave plate, left-hand circular light emerges. If the angle is −45°, the output is right-hand circular. To simplify the following discussion, any axis that defines the orientation of the fast axis will be referred to as the "birefringence axis".

It should be noted that the thickness of the ¼ wave plate can only be chosen correctly for a particular wavelength in the optical portion of the spectrum. At other wavelengths, a small error occurs in the degree of retardation of the slow component. This error leads to a change in the polarization of the light passing directly from display 12 to viewer 14 between the polarization filters. Since the polarization filters only completely block light if there is an exact 90° rotation in polarization between them, a small fraction of the light leaving display 12 will reach the viewer. This results in the viewer seeing a ghost image that varies in intensity with color.

The present invention avoids the ghosting problems associated with prior art systems by utilizing an arrangement of ¼ wave plates in which the second ¼ wave plate reverses the action of the first ¼ wave plate. For example, if the first ¼ wave plate provides a retardation of $\pi/2$ between the two component polarizations of the light signal, then the second ¼ wave plate provides a retardation of $-\pi/2$ between the components. This is accomplished by aligning the ¼ wave plates such that the birefringence axis of the first ¼ wave plate is rotated by 90° relative to the birefringence axis of the second ¼ wave plate.

In the preferred embodiment of the present invention, the ¼ wave plates are constructed from the same material. Consider light of a wavelength that is different from the design wavelength, i.e., the wavelength for which the retardation is precisely $\pi/2$. If the first ¼ wave plate provides a retardation of less than $\pi/2$ than the second ¼ wave plate will also provide a canceling retardation of the same amount. Hence, the polarization of light passing through the two ¼ wave plates will remain unchanged independent of the actual retardation provided by the wave plates.

As noted above, prior art systems are very inefficient in their use of the light source, which is not shown in the drawing. In general, display 12 is illuminated by a non-polarized light source. If display 12 is based on a liquid crystal display, the light striking the display must be linearly polarized. Hence, half of the light from the source is lost. Polarization filter 21 is aligned to pass the light leaving display 12; hence, no further losses occur here. However, half of the light will be lost in passing through beam splitter 22. The remaining light strikes beam splitter 24. Once again, half of the light is reflected, and the remainder is lost. Upon striking beam splitter 22 again, only half of the light is reflected, the remainder being lost. The reflected light must pass through beam splitter 24, which transmits half of the light and reflects the other half. Hence, only $1/16^{th}$ of the light leaving display 12 reaches the viewer.

Another problem with the optical system shown in FIG. 1 is the curvature of the image field. The image plane of the optical system shown in FIG. 1, i.e., the apparent surface on which the image originates, is curved. Hence, display 12 would need to be curved to match the image surface. As a result, various parts of the image will be out of focus.

Figure 2:
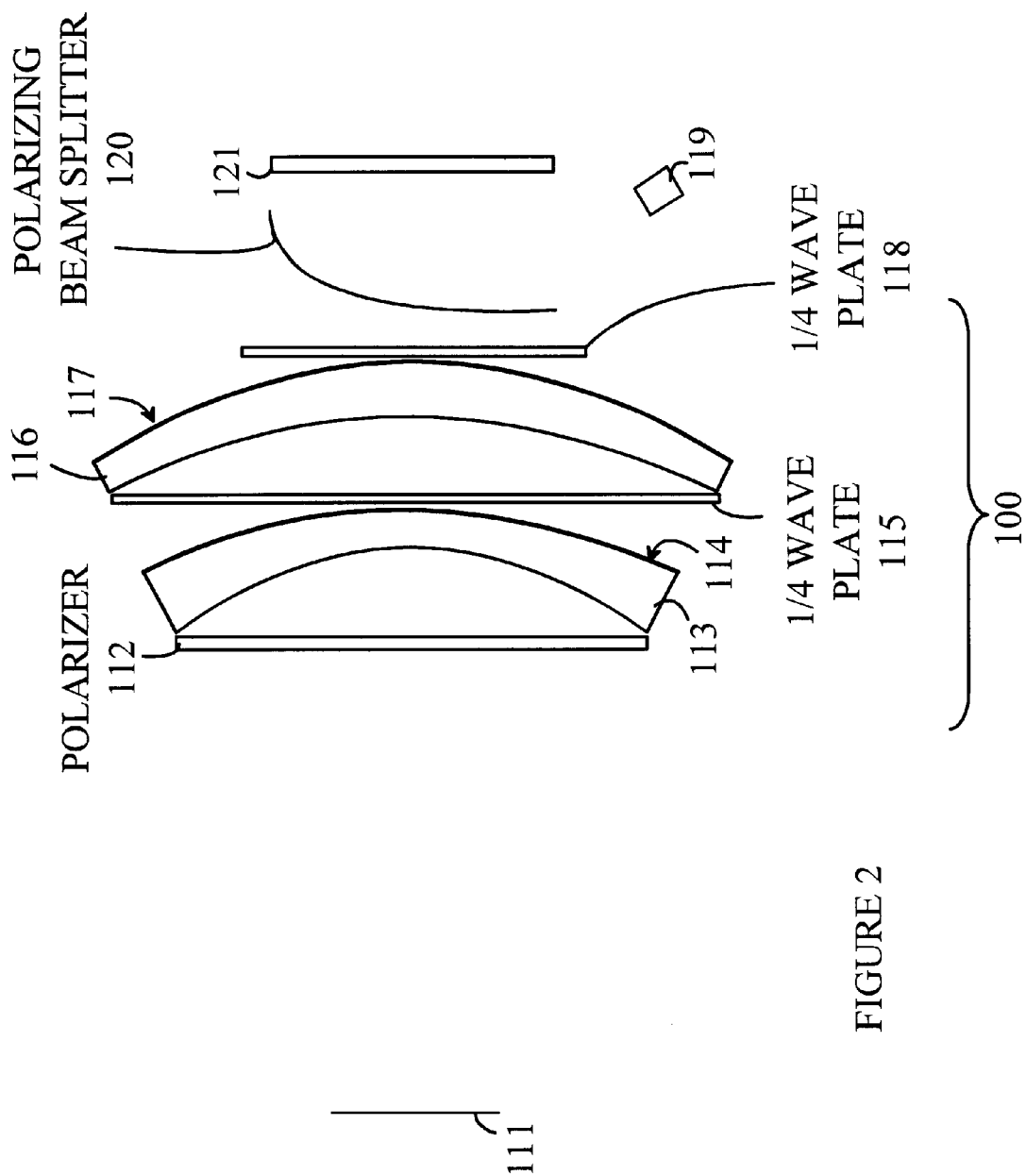
FIG. 2 is a cross-sectional view of one embodiment of a folded optical imaging assembly according to the present invention.

Refer now to FIG. 2, which is a cross-sectional view of a folded optical assembly 100 according to the present invention. Optical assembly 100 operates in a manner analogous to that described above. The ghosting problem of the prior art systems is solved as described above by utilizing a second ¼ wave plate 115 that reverses the action of ¼ wave plate 118. Beam splitter 24 shown in FIG. 1 has been replaced by a spherical beam splitter 114, which is constructed from a partially reflective coating on a glass element 113 having two spherically curved surfaces. Similarly, spherical beam splitter 22 shown in FIG. 1 has been replaced by a spherical beam splitter 117, which is constructed from a partially reflective coating on a glass concave-convex lens 116. In the preferred embodiment of the present invention, the curved surfaces are spherically-shaped.

The display screen 121 is constructed from an LCD shutter and a reflector. The display is illuminated by an off-axis light source 119 that utilizes a polarizing beam splitter 120 to direct light of one polarization toward the display. Light of the orthogonal polarization passes through beam splitter 120 and is lost. Beam splitter 120 is constructed from a material that reflects light of one polarization while transmitting light of the orthogonal polarization. Such materials are known to the art. For example 3M markets such a material under the trade name DUAL BRIGHTNESS ENHANCEMENT FILM (DBEF).

Beam splitter 114 is likewise constructed from a material such as DBEF. The material is oriented such that light of polarization P is passed by the beam splitter and light of polarization S is reflected. Since essentially 100% of the light is either reflected or transmitted, the losses discussed above with respect to beam splitter 24 shown in FIG. 1 are eliminated by the present invention. Accordingly, the present invention allows 4 times more light to reach the user's eye 111.

The combination of the two reflective curved surfaces can provide a perfectly telecentric optical system by suitably selecting the radius of curvature and position of the surfaces. Further, reflective optics are preferred over lenses because of the absence of the aberrations introduced by the lens material. Unfortunately, thin reflective surfaces having sufficient structural integrity are difficult to construct without some form of support. Hence, the present invention utilizes two thin concave-convex lenses with reflective coatings on one surface of each lens. In the preferred embodiment of the present invention, the lens materials and surface curvatures are optimized to provide the highest image quality consistent with the condition that the curvatures are spherical and that the resulting system is substantially telecentric, while minimizing the curvature of the image field. By utilizing convex-concave lenses, the contribution of the lenses to the overall imaging quality is significantly reduced; hence, the problems associated with transmission optics are minimized.

In principle, other lens shapes such as plano-concave or plano-convex lenses can be utilized. However, such lenses are heavier. In addition, the contribution of the lenses to the overall optical system is much greater, and hence, a design that provides corrections for the various lens aberrations is more difficult to construct.

In the preferred embodiment of the present invention, polarizing beam splitter 120 is also constructed from DBEF. Hence, one half the light from the light source is directed to the display screen. Upon reflection at the display, the polarization of the light is rotated through 90 degrees. Accordingly, all of the light returning from the display will pass through beam splitter 120.

Light source 119 is preferably a linear light source. Beam splitter 120 forms a cylindrical surface preferably having a parabolic cross-section, the axis of the cylindrical surface being parallel to the linear light source. The linear light source is positioned relative to the reflector such that light from the linear light source is collimated by the reflector onto the array of reflective pixels in display screen 121.

The above-described embodiments of the present invention have utilized spherical beam splitters. Spherically surfaced optical elements are significantly cheaper to fabricate than optical elements of other shapes. However, other geometries can be utilized without deviating from the teachings of the present invention.

It should also be noted that the position of the ¼ wave plate 118 can be moved relative to the optical assembly comprising lens 113, ¼ wave plate 115, and lens 116 without altering the performance of the overall system. For example, ¼ wave plate 118 can be placed between lens 113 and polarization filter 112.

Various modifications to the present invention will become apparent to those skilled in the art from the foregoing description and accompanying drawings. Accordingly, the present invention is to be limited solely by the scope of the following claims.

What is claimed is:

1. An optical imaging assembly for imaging light from a display, said assembly comprising:
    a first linear polarization filter for passing light polarized in a first direction;
    a second linear polarization filter for passing light polarized in a second direction, said second direction being orthogonal to said first direction;
    a folded imaging assembly comprising a first lens, said first lens having a partially reflective coating on one surface thereof, a first ¼ wave plate, and a second lens, said second lens having a partially reflective coating on one surface thereof; and
    a second ¼ wave plate, wherein
    said folded imaging assembly and said second ¼ wave plate are located between said first and second linear polarization filters.

2. The optical imaging assembly of claim 1 wherein said first and second lenses comprise concave-convex lenses.

3. The optical imaging assembly of claim 1 wherein said first ¼ wave plate has a birefringence axis that is orthogonal to the birefringence axis of said second ¼ wave plate.

4. The optical assembly of claim 1 wherein said partially reflective coating of one of said first and second concave-convex lenses comprises a material having a reflectivity that depends on the direction of linear polarization of light striking said reflective coating.

5. The optical assembly of claim 2 wherein said first convex-concave lens has convex and concave surfaces that are spherical.

6. The optical assembly of claim 3 wherein said first and second ¼ wave plates comprise a layer of the same bi-refingent material.

7. The optical assembly of claim 1 wherein said first and second lenses provide a substantially telecentric optical imaging system.

* * * * *